July 25, 1967 H. L. REINSMA 3,332,725
RECOIL AND SUSPENSION MECHANISM FOR TRACK-TYPE TRACTORS
Filed Oct. 4, 1965 2 Sheets-Sheet 1

INVENTOR.
HAROLD L. REINSMA
BY
Fryer, Zimwald, Fix & Phillips
ATTORNEYS

United States Patent Office 3,332,725
Patented July 25, 1967

3,332,725
RECOIL AND SUSPENSION MECHANISM FOR
TRACK-TYPE TRACTORS
Harold L. Reinsma, Peoria, Ill., assignor to Caterpillar
Tractor Co., Peoria, Ill., a corporation of California
Filed Oct. 4, 1965, Ser. No. 492,402
2 Claims. (Cl. 305—10)

ABSTRACT OF THE DISCLOSURE

A resilient suspension device for the idler which supports the forward end of a tractor track and in which upward shock forces encountered by the idler are transmitted to the horizontally disposed track recoil spring assembly.

A well known type of recoil mechanism for tractors comprises a spring for each track. The spring is mounted on the truck frame and connected with the bearing support of the track idler through an adjusting device. The bearing support is slidably mounted so the spring and adjusting device serve to maintain the track under proper tension, but also permit retraction of the idler against the resilient pressure of the spring when rock or other material becomes lodged between the track and idler or between the track and the driving sprocket.

It is an object of the present invention to provide means which is readily combined with the standard type of recoil mechanisms described above for cushioning shock which occurs upon impact of the forward part of the track with hard objects or high points in an undulating terrain, thus protecting the entire track assembly against the effects of shock.

Further objects and advantages of the invention will be best appreciated from an understanding of the following specification wherein the invention is described in detail by reference to the accompanying drawings.

Figure 1:
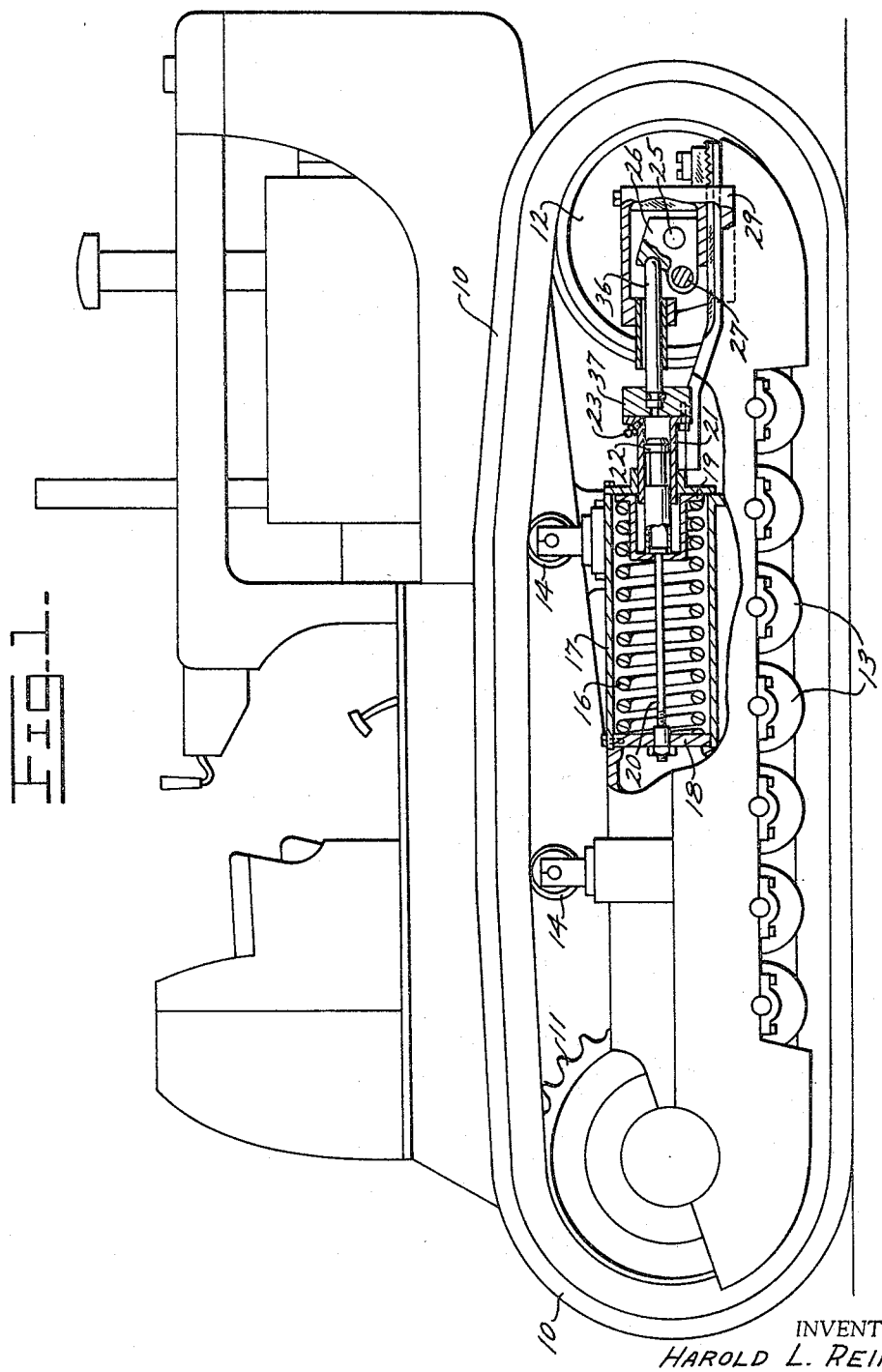
FIG. 1 is a view in side elevation of a track-type tractor with the track illustrated schematically and the recoil and suspension mechanism of the present invention shown in section.

The tractor shown in FIG. 1 has the track components shown schematically at 10, and they are, as is well known, formed in the manner of an endless chain driven by a sprocket 11 and trained over an idler 12 at the forward end of the tractor. The track links provide a track surface which supports the weight of the tractor through track rollers 13 while the upper flight of the endless chain is supported on rollers 14.

A certain degree of tension must be applied to the track chain to insure good driving engagement with the sprocket 11, and means are required to relieve the tension to a limited degree in the event that a rock or other hard object is caught between the chain and the idler or between the chain and the sprocket. In such event track recoil mechanism is provided to permit limited rearward movement of the track idler 12.

The recoil mechanism comprises a recoil spring 16 in a spring housing 17 which is rigidly secured to the truck frame between the sprocket and the idler, the frame being directly supported by the track rollers 13. The spring 16 is seated between one end 18 of the cylindrical housing 17, and a cup-shaped spring seat 19 in the opposite end of the cylinder. A rod 20 with a nut on one end acts between the cup-shaped spring seat and the end 18 of the cylinder to preload the spring, and the connection between the spring seat 19 and the idler includes a conventional hydraulic track adjuster which comprises a cylinder 21 with a piston 22 therein and a fitting 23 through which hydraulic fluid may be injected into the cylinder to vary the distance between the end of the rod seated in the spring seat 19 and the opposite end of the cylinder which, as will be described, forms a connection with the idler 12. The construction so far described is conventional, and usually the cylinder is connected with an idler bearing support so that the idler is maintained in a properly adjusted forward position but is free to retract against the tension of the recoil spring when necessary.

The present invention constitutes an improvement over the conventional recoil mechanism, in that the connection between the hydraulic adjuster and the idler also permits slight upward movement of the idler with the shock of such movement absorbed by the recoil spring. In accordance with the present invention the idler is mounted for rotation about an axle or shaft 25 (see also FIG. 2 and 3) and this shaft is supported in a pair of blocks 26 disposed in box-like housings 29 on opposite sides of the idler. The blocks 26 are disposed for oscillation about pivots 27 so that they can oscillate between a lowermost position shown in FIG. 1, and an uppermost position shown in FIG. 2. The blocks 26 and pins 27, upon which they are supported for rocking movement, are contained within the rectangular housing 29 which are arranged to slide longitudinally of the truck frames on tracks 30 with hardened wear plates 31 interposed between the tracks and the blocks. A stop block, best shown at 33 in FIG. 2, has a serrated surface engaging a complementary serrated surface as at 34 and is held in place by screws 35 to limit the forward movement of the idler.

Figure 2:
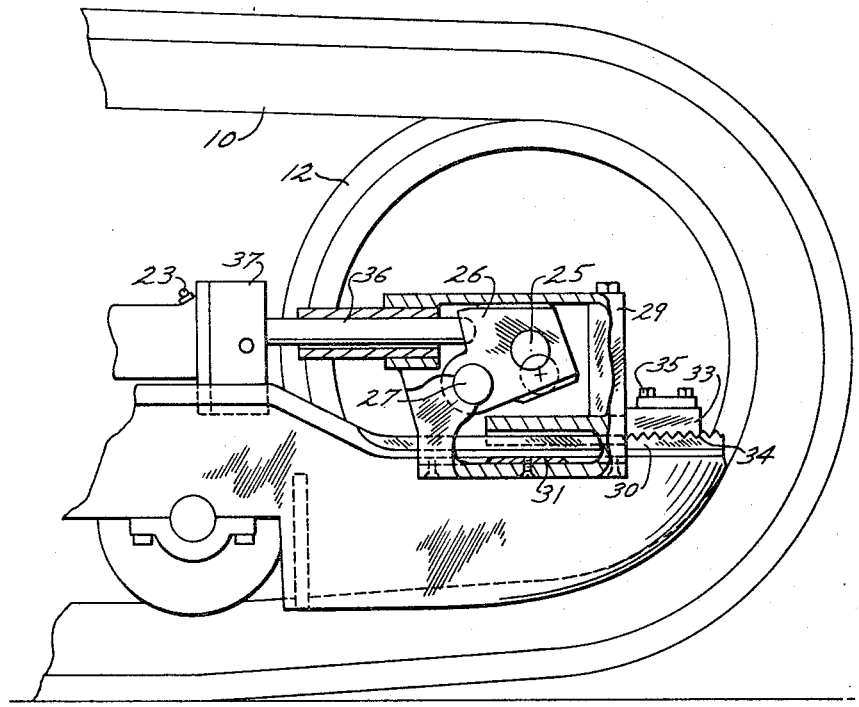
FIG. 2 is an enlarged fragmentary view of the improvements which form the present invention as shown in FIG. 1.
Figure 3:
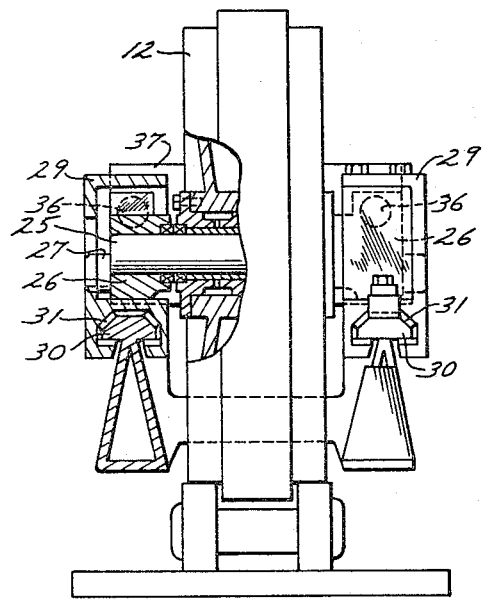
FIG. 3 is a view in front elevation of the track idler showing parts of the present invention in section.

With the construction so far described, the idler is free to move rearwardly of the tractor against the force of the recoil spring or is free to move slightly upwardly on an arcuate path between the two positions shown in FIG. 2. Movement of the idler in either of these directions is transmitted to the recoil mechanism through two thrust rods 36 each resting in a suitable socket in one of the blocks 26 as shown, and having their other ends engaged in a block 37 which forms the head of the hydraulic adjusting cylinder and extends transversely across the truck frame. Thus the severe shocks which are imparted to the entire track mechanism by the engagement of the forward portion of the track with irregularities in the terrain are absorbed in part by the same recoil spring which is employed to permit retraction of the idler to accommodate foreign objects caught between the track and the idler or the track and the driving sprocket.

With the construction of the present invention, the recoil means and hydraulic track adjuster need be modified little, if any, over the construction used in conventional machines. The forward portion of the truck frame is modified slightly to provide the tracks 30 and the relatively small and inexpensive parts such as the blocks 26 in their housings and the rod 36 are all that need be added to a conventional machine to obtain the advantages of the present invention.

This invention provides both vertical and horizontal idler movement restrained by a predetermined preload and spring rate from a single pair of springs normally found on a conventional tractor. Such horizontal spring rate and preload is required to prevent damage to track components in case material becomes lodged in the sprocket or idler. Vertical spring rate and preload is required to attenuate vertical shock loads while providing for tractor operating stability.

The rectangular housing 29 provides a stop limiting upward deflection of the pivoted block 26 and idler 12, and this prevents excess loads from being transmitted to the recoil spring and adjusting mechanism.

I claim:

1. In a tractor having a drive sprocket, an idler, a rigid frame extending between the axes of said sprocket and idler, a track trained over the sprocket and idler, means permitting the idler to recoil parallel to the frame and toward the sprocket, and a recoil spring disposed horizontally and parallel to the frame opposing such recoil movement, the improvement which comprises means to permit the idler to move upwardly, and a connection between said last means and the recoil spring whereby the spring will oppose said upward movement, said means permitting upward movement comprising blocks supporting a shaft upon which the idler rotates, and pivotal supports for said blocks, and thrust extending rods extending longitudinally between said blocks and the recoil spring.

2. The combination of claim 1 and means to limit such upward movement.

References Cited

UNITED STATES PATENTS

| | | | |
|---|---|---|---|
| 2,315,421 | 3/1943 | Heaslet | 305—29 X |
| 2,717,813 | 9/1955 | Gardner | 305—31 |
| 2,858,171 | 10/1958 | Senkowski | 305—30 |
| 2,959,451 | 11/1960 | Weber | 305—10 |

FOREIGN PATENTS 189,170   4/1964   Sweden.

BENJAMIN HERSH, *Primary Examiner.*

RICHARD J. JOHNSON, *Examiner.*